(12) United States Patent
Oh et al.

(10) Patent No.: US 11,281,041 B2
(45) Date of Patent: Mar. 22, 2022

(54) COVER GLASS STRUCTURE AND DISPLAY APPARATUS COMPRISING THEREOF

(71) Applicant: LG Display Co., Ltd., Seoul (KR)

(72) Inventors: KyungHwan Oh, Paju-si (KR); Sejin Jang, Paju-si (KR); YuLim Won, Incheon (KR); Youngjoo Park, Buan (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/702,345

(22) Filed: Dec. 3, 2019

(65) Prior Publication Data

US 2020/0192144 A1  Jun. 18, 2020

(30) Foreign Application Priority Data

Dec. 13, 2018 (KR) .................. 10-2018-0160854

(51) Int. Cl.
*G02F 1/1335* (2006.01)
*G02F 1/13363* (2006.01)

(52) U.S. Cl.
CPC .... *G02F 1/133502* (2013.01); *G02F 1/13363* (2013.01); *G02F 1/133638* (2021.01)

(58) Field of Classification Search
CPC ......... G02F 1/133528; G02F 1/133788; G02F 1/13363; G02F 1/133502; G02F 2001/133638; G02F 2001/133541; G02F 2201/083; G02B 5/3008; G02B 5/3016
See application file for complete search history.

(56) References Cited

U.S. PATENT DOCUMENTS

| 2018/0059300 | A1* | 3/2018 | Kim | ................ G02B 5/3016 |
| 2018/0357462 | A1* | 12/2018 | Mackey | ................ G06F 1/1684 |
| 2020/0012130 | A1* | 1/2020 | Tamada | ............ G02F 1/133308 |
| 2020/0133060 | A1* | 4/2020 | Smith | ................ G02B 5/3016 |

FOREIGN PATENT DOCUMENTS

KR  10-2014-0134148 A  11/2014

* cited by examiner

*Primary Examiner* — Angela K Davison
(74) *Attorney, Agent, or Firm* — Fenwick & West LLP

(57) ABSTRACT

According to an aspect of the present disclosure, a cover glass structure includes: a cover glass; a polarizing layer disposed under the cover glass and including a liquid crystal and a dye; and a phase retardation layer disposed under the polarizing layer. The polarization layer polarizes light propagating through the polarizing layer and the phase retardation layer delays a phase of light propagating through the phase retardation layer.

8 Claims, 3 Drawing Sheets

COVER GLASS STRUCTURE AND DISPLAY APPARATUS COMPRISING THEREOF

CROSS-REFERENCE TO RELATED APPLICATIONS

This application claims the priority of Korean Patent Application No. 10-2018-0160854 filed on Dec. 13, 2018, in the Republic of Korea Intellectual Property Office, the disclosure of which is incorporated herein by reference in its entirety.

BACKGROUND

Field of Technology

The present disclosure relates to a cover glass structure and a display apparatus including the same, and more particularly, to a cover glass in which a polarizing material is coated and a flexible display apparatus including the same.

Description of the Related Art

As display apparatuses which are used for a monitor of a computer, a television, or a cellular phone, there are an electroluminescent display apparatus which is a self-emitting device and a liquid crystal display device (LCD) which requires a separate light source.

The electroluminescent display apparatus may include an organic light emitting diode, an inorganic light emitting diode, a quantum-dot diode, a Perovskite LED, and a micro LED as electroluminescence elements.

Further, recently, a flexible display apparatus which is manufactured by forming a display unit and a wiring line on a flexible substrate such as plastic which is a flexible material so as to be capable of displaying images even though the display apparatus is bent like a paper is getting attention as a next generation display apparatus.

SUMMARY

Inventors of the present disclosure studied a cover glass which could be applicable to a flexible display apparatus. Specifically, a cover glass structure which absorbs external light, improves a flexibility, and reduces a thickness has been studied.

The inventors of the present disclosure provide an absorbing function of external light to the cover glass structure to improve an ambient contrast ratio of a flexible display apparatus including a cover glass structure.

Therefore, the inventors of the present disclosure have attempted to directly coat a polarizing layer on a cover glass which is applied to the flexible display apparatus. The inventors of the present disclosure recognized that when the polarizing layer was directly coated on the cover glass, there was a problem with adhesion so that the cover glass and the polarizing layer would separate from each other.

Therefore, the inventors of the present disclosure have attempted to develop a cover glass structure which may improve an interface adhesion of the polarizing layer coated on the cover glass. Further, the inventors of the present disclosure recognized that the interface adhesion was improved and when a user wore polarized sunglasses, an image could be blocked at a specific viewing angle by the polarizing layer.

Therefore, the inventors of the present disclosure have attempted to develop a cover glass structure which could display images regardless of the wearing of polarized sunglasses.

Therefore, an object to be achieved by the present disclosure is to provide a cover glass structure which improves a flexibility by reducing a thickness of a cover glass structure and improves an interface adhesion between a cover glass and a polarizing layer and a flexible display apparatus including the same.

Another object to be achieved by the present disclosure is to provide a cover glass structure which is capable of displaying images regardless of the polarized sunglasses, while improving the interface adhesion between the cover glass and the polarizing layer and a flexible display apparatus including the same.

Objects of the present disclosure are not limited to the above-mentioned objects, and other objects, which are not mentioned above, can be clearly understood by those skilled in the art from the following descriptions.

In order to solve the above described problems, some embodiments relate to a cover glass structure includes a cover glass, a polarizing layer and a phase retardation layer. The polarizing layer is disposed under the cover glass and includes a liquid crystal and a dye. The polarizing layer is configured to polarize light propagating through the polarizing layer. The phase retardation layer is disposed under the polarizing layer. The phase retardation layer is configured to delay a phase of light propagating through the phase retardation layer.

In some embodiments, the cover glass structure further includes a primer layer and an optical adhesive layer. The primer layer is disposed between the cover glass and the polarizing layer. The optical adhesive layer is disposed between the polarization layer and the phase retardation layer. In some embodiments, the primer layer and the polarizing layer are in direct contact with each other. In some embodiments, the cover glass and the primer layer are in direct contact with each other. In some embodiments, the primer layer includes acrylate. In some embodiments, a thickness of the primer layer is 3 μm to 7 μm. In some embodiments, the primer layer includes a liquid crystal. In some embodiments, the primer layer is coated on the rear surface of the cover glass. In some embodiments, the polarizing layer is coated on the rear surface of the primer layer.

In some embodiments, a thickness of the cover glass is 50 μm to 90 μm.

In some embodiments, a thickness of the polarizing layer is 1 μm to 5 μm.

In some embodiments, a thickness of the cover glass structure is not greater than 99 μm.

In some embodiments, the polarizing layer is configured to have a linear polarization property and the phase retardation layer is configured to have a circular polarization property. In some embodiments, the primer layer has a circular polarization property.

In some embodiments, the cover glass further includes a display panel disposed under the phase retardation layer. At least a portion of light incident on the cover glass structure is linearly polarized by the polarizing layer, circularly polarized by the phase retardation layer, reflected by the display panel, linearly polarized by the phase retardation layer, and blocked by the polarizing layer.

In some embodiments, the phase retardation layer includes a quarter wave plate (QWP).

Some embodiments relate to a flexible display apparatus that includes a flexible cover glass, a polarizing layer, a phase retardation layer, and a flexible display panel. The polarizing layer is disposed under the cover glass and including a liquid crystal and a dye. The polarizing layer is configured to polarize light propagating through the polarizing layer. The phase retardation layer is disposed under the polarizing layer. The phase retardation layer is configured to delay a phase of light propagating through the phase retardation layer. The flexible display panel is disposed under the phase retardation layer.

In some embodiments, the flexible display apparatus further includes a primer layer and an optical adhesive layer. The primer layer is disposed between the cover glass and the polarizing layer. The optical adhesive layer is disposed between the polarization layer and the phase retardation layer. In some embodiments, the primer layer is coated on the rear surface of the flexible cover glass. In some embodiments, the polarizing layer is coated on the rear surface of the primer layer. In some embodiments, the primer layer and the polarizing layer are in direct contact with each other. In some embodiments, the cover glass and the primer layer are in direct contact with each other.

Other detailed matters of the exemplary embodiments are included in the detailed description and the drawings.

According to the present disclosure, the cover glass structure may absorb external light, improve a flexibility, and reduce a thickness. The cover glass structure according to the present disclosure may improve an ambient contrast ratio of the flexible display apparatus by absorbing the external light. The cover glass structure according to the present disclosure may improve an interface adhesion of the polarizing layer coated on the cover glass. The cover glass structure according to the present disclosure may display images regardless of the wearing of polarized sunglasses.

The cover glass structure according to the present disclosure may reduce the thickness, improve the flexibility, and improve the interface adhesion between the cover glass and the polarizing layer to be applied to the flexible display apparatus.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
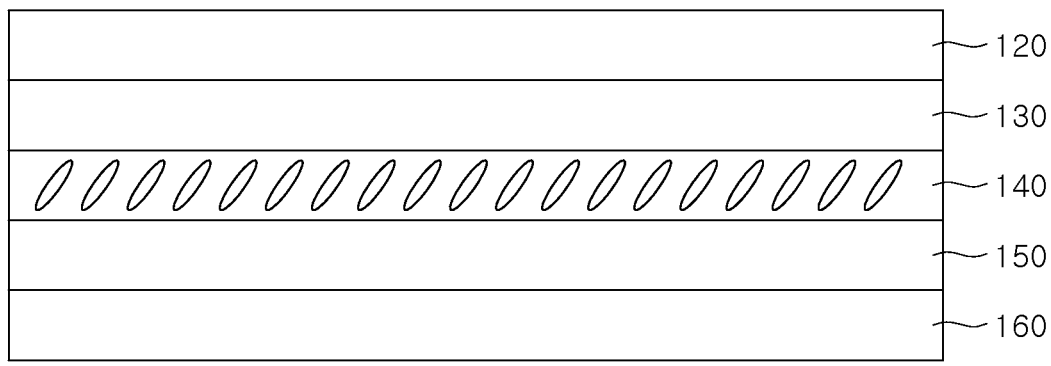
FIG. 1 is a cross-sectional view of a cover glass structure according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a cover glass structure and a display apparatus including the same according to exemplary embodiments of the present disclosure will be described in detail with reference to accompanying drawings.

FIG. 1 is a cross-sectional view of a cover glass structure according to an exemplary embodiment of the present disclosure.

A cover glass structure 110 according to an exemplary embodiment of the present disclosure includes a cover glass 120, a primer layer 130, a polarizing layer 140, an optical adhesive layer 150, and a phase retardation layer 160.

The primer layer 130 is disposed on a rear surface of the cover glass 120. The polarizing layer 140 is disposed on the rear surface of the primer layer 130.

The cover glass 120 may protect a flexible display panel which will be described below, from impacts, moisture, heat, and the like of the outside. The cover glass 120 is formed of a foldable glass having a specific thickness. The cover glass 120 may be a tempered glass having a low Young's modulus to reduce a crack due to external impacts. In order to improve the foldability, the thickness of the cover glass 120 may be 50 µm to 90 µm. Desirably, the thickness of the cover glass 120 may be 70 µm. The cover glass 120 may be an etched thin tempered glass. With the above-described configuration, the flexibility of the cover glass 120 may be improved. The cover glass 120 may be tempered. For example, the tempering process of the cover glass 120 may be performed by etching tempering, thermal tempering, chemical tempering, and the like.

The primer layer 130 is disposed on a rear surface of the cover glass 120. The primer layer 130 and the cover glass 120 are configured to be in direct contact with each other. A solvent used to manufacture the primer layer 130 may be an acrylate based material. A thickness of the primer layer 130 may be 3 µm to 7 µm. Desirably, the thickness of the primer layer 130 may be 5 µm.

The primer layer 130 may reduce or prevent separation of the polarizing layer 140 from the cover glass 120. In other words, when the liquid crystal of the polarizing layer 140 is in direct contact with the cover glass 120, the interface adhesion is insufficient so that the polarizing layer 140 may be separated from the cover glass 120. However, the primer layer 130 may improve the adhesion between the polarizing layer 140 and the cover glass 120. Further, the thickness of the primer layer 130 may be formed to be 7 µm or smaller, so that the increase of the thickness of the cover glass 110 may be reduced. Therefore, the foldability of the cover glass structure 110 may be improved.

The polarizing layer 140 selectively transmits light to absorb external light which is incident onto the cover glass structure 110. The polarizing layer 140 is configured by a linear-polarizing layer. The polarizing layer 140 has a linear polarizing axis. When external light which is not polarized is incident, the polarizing layer 140 passes only a light component which is parallel to the polarizing layer and blocks a light component which is not parallel to the polarizing layer. Therefore, the light which passes through the polarizing layer 140 is linearly polarized. The linearly polarized light propagates while oscillating in a direction of the polarizing axis. Further, the polarizing layer 140 absorbs light in a direction intersecting the polarizing axis.

Figure 3:
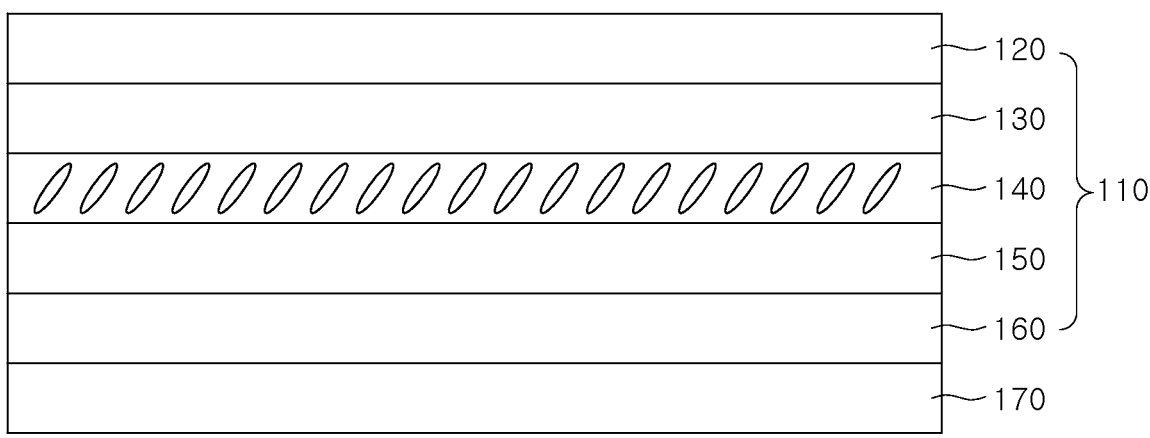
FIG. 3 is a cross-sectional view of a flexible display apparatus according to still another exemplary embodiment of the present disclosure.

For example, the flexible display panel 170 illustrated in FIG. 3 includes various metal layers which are applied to a thin film transistor, a wiring line, an electroluminescent element, and the like. Therefore, the external light incident onto the flexible display panel 170 may be reflected from the metal layer and the visibility of the flexible display apparatus 100 may be reduced due to the reflection of the external light. However, when the polarizing layer 140 is disposed, the polarizing layer 140 absorbs external light to increase an ambient contract ratio of the flexible display apparatus 100 illustrated in FIG. 3.

The polarizing layer 140 is disposed on the rear surface of the primer layer 130. The polarizing layer 140 and the primer layer 130 are configured to be in direct contact with each other. A thickness of the polarizing layer 140 may be 1 µm to 5 µm. More desirably, the thickness of the polarizing layer 140 may be 3 µm.

The polarizing layer 140 may be formed by coating a mixed liquid crystal and dye. The dye may be formed by mixing a black based dye or yellow, magenta, and cyan based dyes. The liquid crystal of the polarizing layer 140 may be aligned using an UV orientation technique.

The polarizing layer 140 may be formed by coating a mixture of liquid crystal and dye which are responsive to the light on a liquid crystal alignment film. The orientation direction of the liquid crystal is set so that the dye may be aligned in the same direction as the orientation direction of the liquid crystal. The liquid crystal alignment film may be produced by making a mixture of a photo-responsive liquid crystal having a function of aligning a molecular aligning direction of the liquid crystal and a dye as a film. For example, the liquid crystal alignment film may be implemented by a guest-host type polarizer.

Therefore, an orientation direction of a coated photo-responsive liquid crystal may be set using the liquid crystal alignment film. In this case, the dye may be aligned in the same direction as the direction of the liquid crystal. Therefore, the dye may have a linear polarizing plate characteristic which selectively absorbs light.

Further, the coated mixture of the photo-responsive liquid crystal and the dye may be hardened. When the mixture of the photo-responsive liquid crystal and the dye are hardened on the liquid crystal alignment film to have a uniform thickness, the mixture of the photo-responsive liquid crystal and the dye may be manufactured as a filmed polarizing layer 140.

In other words, an alignment film is applied to manufacture the polarizing layer 140. The alignment film may be implemented by the polymer. The alignment film may have an anisotropic property which is a physical/chemical orientation property at the molecular level by exposing the polarized ultraviolet ray (UV). That is, when the polarized ultraviolet ray (UV) is irradiated, the orientation direction of the liquid crystal may be set. Further, the orientation direction of the liquid crystal is set so that the dye may be aligned in the same direction as the orientation direction of the liquid crystal. Further, a thermal treatment process is performed to manufacture the polarizing layer 140 in a solid state.

In the related art, a polyvinyl alcohol (PVA)-based resin and a saponified polyvinyl acetate-based resin were stretched to form a polarizing layer. However, such a stretched resin may be damaged by tensile or compressive stress due to folding of a flexible display apparatus.

When the polarizing layer 140 is formed by the mixture of the liquid crystal and the dye aligned by the polarized ultraviolet (UV), the thickness of the polarizing layer 140 may be reduced. Further, the damage of the polarizing layer 140 due to the stress in accordance with the folding of the cover glass structure 110 may be reduced as compared with the related art.

Further, the thickness of the polarizing layer 140 may be formed to be 5 µm or smaller, so that the increase of the thickness of the cover glass 110 may be reduced. Therefore, the foldability of the cover glass structure 110 may be improved.

The optical adhesive layer 150 is disposed on a lower surface of the polarizing layer 140. The optical adhesive layer 150 is configured to be directly attached to the polarizing layer 140. The optical adhesive layer 150 may be formed of a transparent adhesive layer such as an optical clear resin (OCR) or an optical clear adhesive (OCA). A thickness of the optical adhesive layer 150 may be 3 µm to 8 µm. Desirably, the thickness of the optical adhesive layer 150 may be 5 µm. The optical adhesive layer 150 may be attached to the phase retardation layer 160.

The phase retardation layer 160 is disposed on a lower surface of the optical adhesive layer 150. The phase retardation layer 160 has a retardation axis in which a retardation angle is set in advance. The phase retardation layer 160 delays a phase of the incident external light by a phase difference value. The phase retardation layer 160 may be implemented by a quarter wave plate (QWP). The phase retardation layer 160 is manufactured as a film shape and then attached to the polarizing layer 140 by the optical adhesive layer 150. A phase difference value of the quarter wave plate is a quarter of a center wavelength. When external light which is linearly polarized by the polarizing layer 140 is incident, the phase retardation layer 160 changes the linearly polarized light to a circularly polarized light and then outputs the circularly polarized light. Further, when the circularly polarized light is incident, the phase retardation layer 160 changes the circularly polarized light to the linearly polarized light and then outputs the linearly polarized light. That is, the phase retardation layer 160 changes the phase by $\lambda/4$. Further, when the external light which is linearly polarized by the polarizing layer 140 passes through the phase retardation layer 160 and then is reflected by the flexible display panel 170 to be disposed on the rear surface of the phase retardation layer 160 and then passes through the phase retardation layer 160. The linearly polarized light output from the phase retardation layer 160 and propagating towards the polarizing layer 140 has an optical polarization axis that is rotated by 90° compared to light propagating towards the phase retardation layer 160 from the polarizing layer 140. Thus, the linearly polarized light output from the phase retardation layer 160 is blocked by the polarizing layer 140. In some exemplary embodiments, the phase retardation layer 160 may be configured to further include a positive C plate.

In other words, the reflected light passes through the polarizing layer 140 to be linearly polarized and passes through the phase retardation layer 160 to be circularly polarized. The light is reflected by the flexible display panel 170 and passes through the phase retardation layer 160 to rotate 90° and is absorbed by the polarizing layer 140.

In the cover glass structure 110 according to the exemplary embodiment of the present disclosure, the cover glass 120, the primer layer 130, the polarizing layer 140, the optical adhesive layer 150, and the phase retardation layer 160 are sequentially formed so that the thickness of the cover glass structure 110 may be reduced. For example, the cover glass structure 110 may be implemented to have a thickness of approximately 89 μm by laminating the cover glass 120 having a thickness of 70 μm, the primer layer 130 having a thickness of 5 μm, the polarizing layer 140 having a thickness of 3 μm, the optical adhesive layer 150 having a thickness of 5 μm, and the phase retardation layer 160 having a thickness of 6 μm. For example, specifically, when the cover glass structure 110 is implemented to have a thickness of 99 μm or smaller, the foldability may be improved.

Specifically, since the primer layer 130 and the polarizing layer 140 of the cover glass structure 110 are formed by the coating manner, the cover glass 120 and the primer layer 130 are in direct contact with each other, and the polarizing layer 140 and the primer layer 130 are in direct contact with each other, the thickness may be reduced while improving the adhesion.

Figure 2:
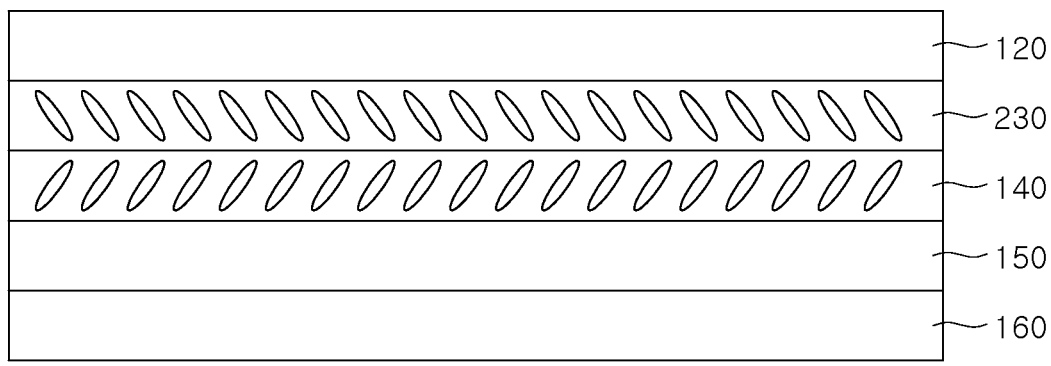
FIG. 2 is a cross-sectional view of a cover glass structure according to another exemplary embodiment of the present disclosure.

FIG. 2 is a cross-sectional view of a cover glass structure according to another exemplary embodiment of the present disclosure.

A cover glass structure 120 according to another exemplary embodiment of the present disclosure has substantially the similar structure to the cover glass structure 110 according to one exemplary embodiment of the present disclosure except for the primer layer 230. Therefore, for the convenience of description, a redundant description will be omitted.

A primer layer 230 of the cover glass structure 210 according to another exemplary embodiment of the present disclosure is configured to further include a liquid crystal which is aligned in a specific direction in a material which forms the primer layer. In other words, the primer layer 230 according to another exemplary embodiment of the present disclosure may be formed by mixing the primer layer 130 according to one exemplary embodiment of the present disclosure with the liquid crystal. The liquid crystal of the primer layer 230 is aligned in a specific direction. The liquid crystal of the primer layer 230 may be aligned using an UV orientation technique. Therefore, a redundant description will be omitted.

The primer layer 230 may be formed by mixing the liquid crystal which is responsive to the light to the primer layer 230. The primer layer 230 may align the liquid crystal. The primer layer 230 may be produced by making a mixture of a photo-responsive liquid crystal having a function of aligning a molecular aligning direction of the liquid crystal and a primer as a film.

Ultraviolet ray (UV) is irradiated onto the primer layer 230 to harden the primer layer 230 including the coated photo-responsive liquid crystal.

The primer layer 230 may be configured to have a retardation axis in which a retardation angle is set in advance. The primer layer 230 delays a phase of the incident external light by a phase difference value. The phase difference of the primer layer 230 may be implemented by $4/\lambda$.

According to the above-described configuration, the image which is output from the flexible display panel 170 to pass through the polarizing layer 140 and be linearly polarized is changed to a circularly polarized image by the primer layer 230 including the liquid crystal to be output. Therefore, even though the user wears polarized sunglasses to watch images, the problem in that the image is blocked by the polarized sunglasses is solved. Further, even though the primer layer 230 further includes the liquid crystal, the thickness is not substantially increased. Furthermore, the adhesion of the primer layer 230 may not be substantially degraded.

FIG. 3 is a cross-sectional view of a flexible display apparatus including a cover glass structure 110 according to still another exemplary embodiment of the present disclosure.

The flexible display apparatus 100 according to still another exemplary embodiment of the present disclosure includes a cover glass structure 110 according to one exemplary embodiment of the present disclosure and a flexible display panel 170. However, the present disclosure is not limited thereto and the flexible display apparatus 100 may include a cover glass structure 210 according to another exemplary embodiment of the present disclosure and the flexible display panel 170.

The flexible display panel 170 is disposed on a rear surface of the cover glass structure 110. The cover glass structure 110 and the flexible display panel 170 may be attached by a transparent adhesive layer such as OCR or OCA, but the present disclosure is not limited thereto.

The flexible display panel 170 is a panel in which images are implemented. Display elements for implementing images and circuits, wiring lines, components, and the like for driving the display elements may be disposed in the display panel. The flexible display panel 170 may be a foldable display panel, a rollable display panel, a flexible display panel, or the like.

The cover glass structure 110 is disposed above the flexible display panel 170. The flexible display panel 170 may be configured to include an active area and a non-active area. In the active area AA, images are displayed and a plurality of pixels is disposed. In the active area AA, the display elements for displaying images and circuit units for driving the display elements may be disposed. For example, when the flexible display apparatus 100 is an electroluminescent display apparatus, the display element may include an electroluminescent element. Hereinafter, for the convenience of description, it is assumed that the display apparatus according to various exemplary embodiments of the present disclosure is a flexible display apparatus 100 including an electroluminescent element, but is not limited thereto.

The circuit units may include various thin film transistors, capacitors, wiring lines, and the like for driving the electroluminescent elements. For example, the circuit units may include various configurations such as a driving thin film transistor, a switching thin film transistor, a storage capacitor, a gate line, and a data line, but are not limited thereto.

The non-active area is an area where images are not displayed and a circuit, a wiring line, a component, and the like for driving the display element of the active area are disposed in the non-active area. In the non-active area, various ICs such as a gate driver IC and a data driver IC and driving circuits may be disposed. For example, various ICs and the driving circuit may be formed in the non-active area of the flexible display panel 170 by a gate in panel (GIP) manner or connected to the flexible display panel 170 by a tape carrier package (TCP) or a chip on film (COF) manner.

In the meantime, the flexible display panel 170 may be a foldable display panel. In this case, the flexible display panel 170 may include a folding area and a non-folding area.

The folding area is an area where the flexible display panel 170 is folded and includes an active area and a part of a non-active area. The non-folding area is an area where the flexible display panel 170 maintains a flat state. The non-folding area includes an active area and the other part of the non-active area. The non-folding area is disposed at both sides of the folding area.

A back plate (not shown herein) is provided below the flexible display panel 170. When a substrate of the flexible display panel 170 is formed of a plastic material such as polyimide (PI), the manufacturing process of the display apparatus is performed under a circumstance in which a support substrate formed of glass is disposed below the substrate. After manufacturing the flexible display panel 170 on the support substrate, the support substrate may be released. The support substrate may be a glass substrate. However, a component for supporting the substrate is necessary even after releasing the support substrate, so that a back plate for supporting the substrate may be disposed below the substrate, but is not limited thereto. The back plate may protect the flexible display panel 170 from moisture, heat, impact, and the like from the outside. The back plate and the flexible display panel 170 may be attached by an adhesive layer.

In some exemplary embodiments, ends on both side surfaces of the cover glass 120 may be chamfered. According to the above-described configuration, the impact resistance of the cover glass 120 may be improved by the chamfered structure. The chamfered structure may be provided to at least upper corner of the cover glass 120. More specifically, the chamfered structure may be provided to upper and lower corners of the cover glass 120. When the chamfered structure is provided to both corners of the cover glass 120, the impact resistance may be further improved.

In some exemplary embodiments, an anti-fingerprint layer (not shown herein) may be disposed on the cover glass 120 (not illustrated). The anti-fingerprint layer may reduce a trace remaining on an upper surface of the cover glass 120. The anti-fingerprint layer may be coated to be provided on the upper surface of the cover glass 120. The anti-fingerprint layer may be formed by coating a fluorine compound having a low surface energy on the cover glass 120.

In some exemplary embodiments, a touch panel (not shown herein) may be further disposed between the flexible display panel 170 and the cover glass 120. The touch panel is a device which senses a screen touch on the flexible display apparatus 100 or a touch input of the user such as a gesture and may be a resistive type, a capacitive type, an optical type, or an electromagnetic type.

According to the above-described configuration, the cover glass structure 110 is implemented to be thin by sequentially coating of the cover glass 120, the primer layer 130, and the polarizing layer 140, so that the increase of the thickness of the flexible display apparatus 100 may be reduced. Further, the flexible display apparatus 100 may provide images with circularly polarized light such that a user who wears polarized sunglasses can view the images.

Further, the cover glass structure 110 has a structure integrated by coating the primer layer 130 and the polarizing layer 140 so that the manufacturing process of the flexible display apparatus 100 may be simplified and the manufacturing cost may also be reduced.

The exemplary embodiments of the present disclosure can also be described as follows:

According to an aspect of the present disclosure, a cover glass structure includes: a thin film cover glass; a primer layer disposed on a rear surface of the thin film cover glass; a polarizing layer disposed on a rear surface of the primer layer and includes a liquid crystal and a dye; an optical adhesive layer disposed on a rear surface of the polarizing layer; and a phase retardation layer disposed on a rear surface of the optical adhesive layer.

The primer layer and the polarizing layer may be in direct contact with each other.

The cover glass and the primer layer may be in direct contact with each other.

The primer layer may include acrylate.

An adhesion between the cover glass and the polarizing layer may be increased by the primer layer.

A thickness of the primer layer may be 3 μm to 7 μm.

A thickness of the cover glass may be 50 μm to 90 μm.

A thickness of the polarizing layer may be 1 μm to 5 μm.

A thickness of the cover glass structure may be 99 μm or smaller.

The primer layer and the polarizing layer may include a liquid crystal which is aligned by the ultraviolet ray.

The polarizing layer may be configured to have a linear polarization property and the phase retardation layer is configured to have a circular polarization property.

The primer layer may be configured to have a circular polarization property to provide sunglass-free effect.

The primer layer may be coated on the rear surface of the thin film cover glass.

The polarizing layer may be coated on the rear surface of the primer layer.

According to another aspect of the present disclosure, a flexible display apparatus includes: a flexible cover glass; a primer layer disposed on a rear surface of the flexible cover glass; a polarizing layer disposed on a rear surface of the primer layer and includes a liquid crystal and a dye; an optical adhesive layer disposed on a rear surface of the polarizing layer; a phase retardation layer disposed on a rear surface of the optical adhesive layer; and a flexible display panel disposed on a rear surface of the phase retardation layer.

The primer layer may be coated on the rear surface of the flexible cover glass.

The polarizing layer may be coated on the rear surface of the primer layer.

The primer layer and the polarizing layer may be in direct contact with each other.

The cover glass and the primer layer may be in direct contact with each other.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A cover glass structure, comprising:
   a cover glass formed of a glass having a thickness of 50 μm to 90 μm;
   a primer layer disposed under the cover glass and configured to have a single layer including acrylate;
   a polarizing layer disposed under the primer layer and including a liquid crystal and a dye, wherein the polarizing layer is configured to polarize light propagating through the polarizing layer; and
   a phase retardation layer disposed under the polarizing layer, wherein the phase retardation layer is configured to delay a phase of light propagating through the phase retardation layer,
   wherein the primer layer is coated with a thickness of 3 μm to 7 μm on a rear surface of the cover glass and the polarizing layer is coated with a thickness of 1 μm to 5 μm on a rear surface of the primer layer so that an upper surface of the primer layer is in direct contact with the cover glass and the rear surface of the primer layer is in direct contact with the polarizing layer,
   wherein the cover glass, the primer layer, and the polarizing layer are integrated by coating without an adhesive,
   wherein a sum of a thickness of the cover glass, the primer layer, the polarizing layer, and the phase retardation layer is less than 99 μm.

2. The cover glass structure according to claim 1, further comprising:
   an optical adhesive layer disposed between the polarizing layer and the phase retardation layer.

3. The cover glass structure according to claim 1, further comprising a display panel disposed under the phase retardation layer, wherein at least a portion of light incident on the cover glass structure is linearly polarized by the polarizing layer, circularly polarized by the phase retardation layer, reflected by the display panel, linearly polarized by the phase retardation layer, and blocked by the polarizing layer.

4. The cover glass structure according to claim 1, wherein the phase retardation layer includes a quarter wave plate (QWP).

5. The cover glass structure according to claim 1, wherein the polarizing layer is configured to have a linear polarization property and the phase retardation layer is configured to have a circular polarization property.

6. The cover glass structure according to claim 5, wherein the primer layer has a circular polarization property.

7. A flexible display apparatus, comprising:
   a flexible cover glass formed of a glass having a thickness of 50 μm to 90 μm;
   a primer layer disposed under the flexible cover glass and configured to have a single layer including acrylate;
   a polarizing layer disposed under the primer layer and including a liquid crystal and a dye, wherein the polarizing layer is configured to polarize light propagating through the polarizing layer;
   a phase retardation layer disposed under the polarizing layer, wherein the phase retardation layer is configured to delay a phase of light propagating through the phase retardation layer; and
   a flexible display panel disposed under the phase retardation layer,
   wherein the primer layer is coated with a thickness of 3 μm to 7 μm on a rear surface of the flexible cover glass and the polarizing layer is coated with a thickness of 1 μm to 5 μm on a rear surface of the primer layer so that an upper surface of the primer layer is in direct contact with the flexible cover glass and the rear surface of the primer layer is in direct contact with the polarizing layer,
   wherein the cover glass, the primer layer, and the polarizing layer are integrated by coating without an adhesive,
   wherein a sum of a thickness of the flexible cover glass, the primer layer, the polarizing layer, and the phase retardation layer is less than 99 μm.

8. The flexible display apparatus according to claim 7, further comprising:
   an optical adhesive layer disposed between the polarizing layer and the phase retardation layer.

* * * * *